United States Patent [19]

Cole

[11] 4,037,365
[45] July 26, 1977

[54] APPARATUS FOR CUTTING ARCUATELY-SHAPED WORMS

[75] Inventor: Carroll Richard Cole, Decatur, Ill.

[73] Assignee: Caterpillar Tractor Co., Peoria, Ill.

[21] Appl. No.: 699,760

[22] Filed: June 25, 1976

[51] Int. Cl.$^2$ .............................................. B24B 5/26
[52] U.S. Cl. ........................................ 51/97 R; 90/6; 90/11.62
[58] Field of Search ................. 51/97 R, 289 R; 90/6, 90/11.62

[56] References Cited

U.S. PATENT DOCUMENTS

| 2,142,415 | 1/1939 | Riordan | 51/97 R |
| 2,224,817 | 12/1940 | Hawgood | 51/97 R |

Primary Examiner—Harold D. Whitehead
Assistant Examiner—Nicholas P. Godici
Attorney, Agent, or Firm—Wegner, Stellman, McCord, Wiles & Wood

[57] ABSTRACT

An apparatus for cutting an arcuately-shaped worm includes a support shaft adapted to carry a worm blank thereon and journalled in a frame which is mounted for pivotal movement about a fixed axis so that the worm blank may be simultaneously rotated on its axis and arcuately translated about the fixed axis relative to a cutter. The shaft is rotated by a drive means, and arcuate translation of the shaft is provided by a worm gear which is journalled in the frame and driven off the shaft, with the worm engaging a fixed gear segment, so the rate of rotation and of arcuate translation are coordinated.

1 Claim, 2 Drawing Figures

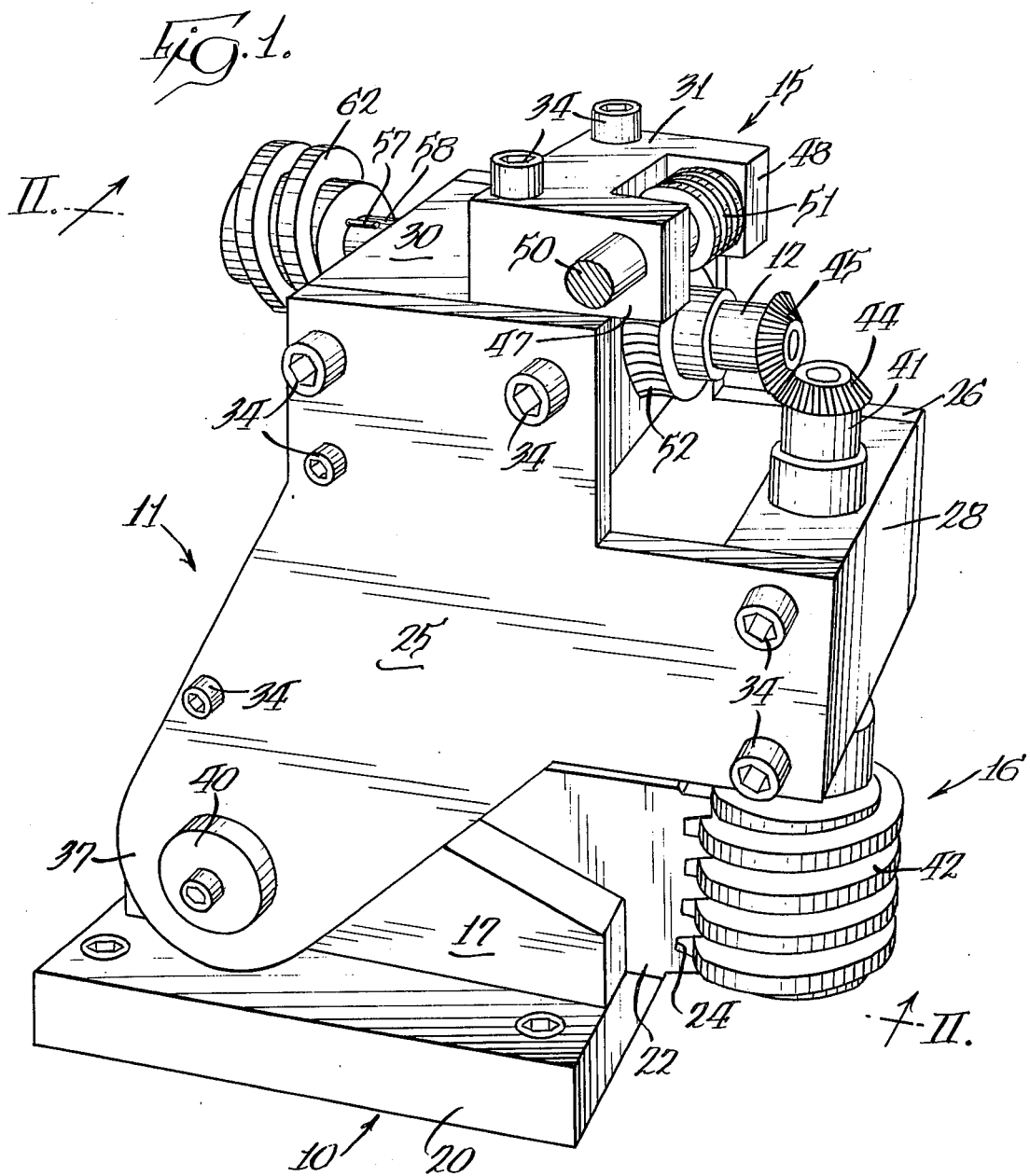

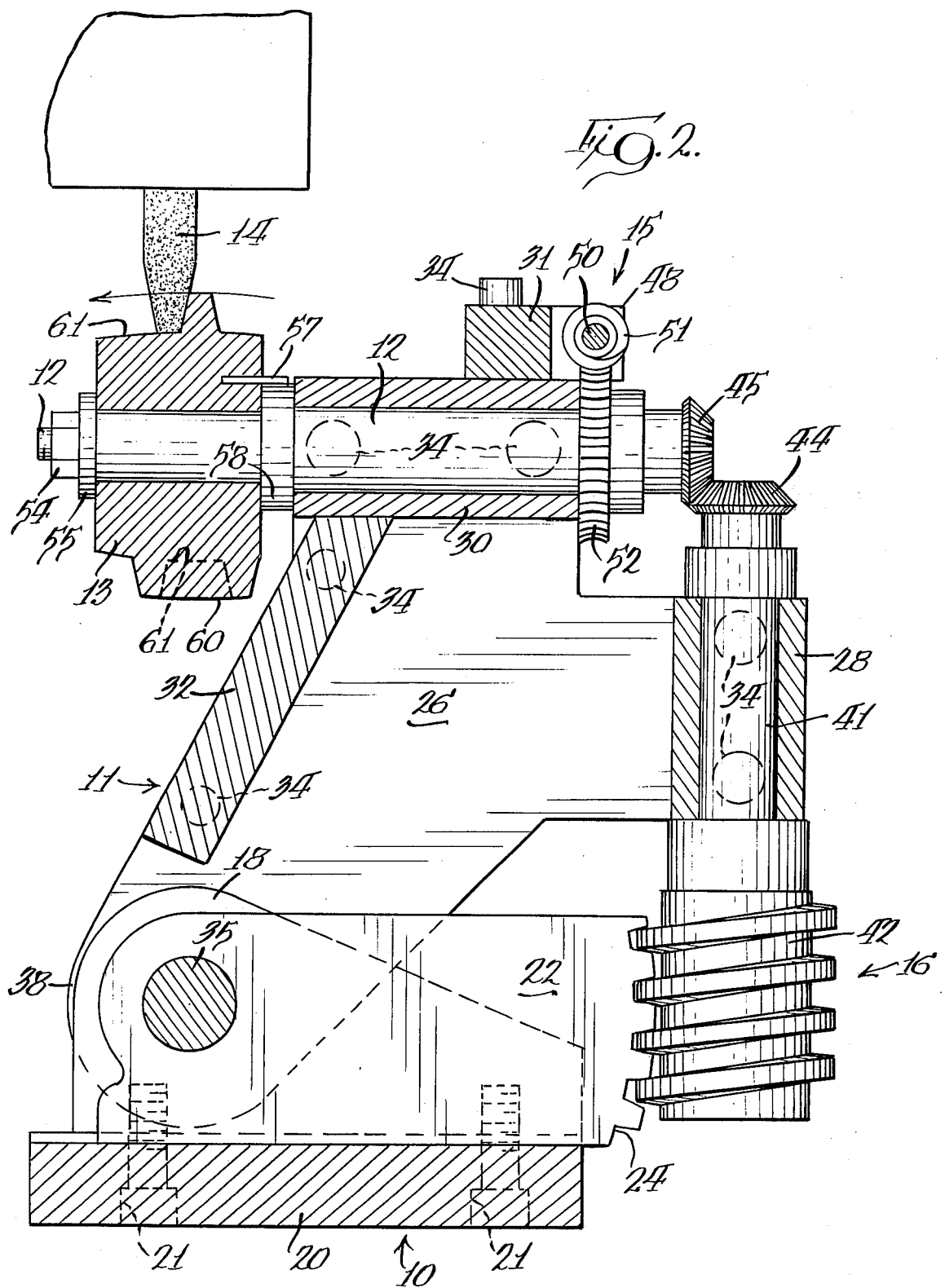

APPARATUS FOR CUTTING ARCUATELY-SHAPED WORMS

BACKGROUND OF THE INVENTION

The present invention relates generally to apparatus for cutting gears and, more particularly, to apparatus for cutting arcuately-shaped worms.

A worm gear is a gear generally including a worm and a worm wheel, and is usually employed to connect nonparallel, nonintersecting, perpendicular shafts. Most often, the worm is the driving gear and the worm wheel is the driven gear. The worm has a shank around which at least one complete tooth is helically formed. In many applications, the outer contour of the shank and the tooth is constructed so as to generally conform with the gear face of the wheel which it drives. For instance, a worm may be barrel-shaped (i.e., convexly curved) so that it meshes with an internal ring gear, the radius of curvature of the respective gear faces being similar to increase the contact area therebetween; or it may be hourglass-shaped (concavely curved) to mesh with an externally toothed gear.

Manufacturing such an arcuately-shaped worm may present substantial difficulties since the worm blank must simultaneously be rotated about the worm axis and be moved axially and arcuately relative to the gear cutter, all at predetermined fixed rates. The apparatus here is intended to cut such arcuately-shaped worms. Although the apparatus is primarily intended to cut worms with a relatively large pitch diameter and of relatively short length having few revolutions of the tooth about the shank, it need not be so limited.

Schurr U.S. Pat. No. 1,960,460 discloses a device for rotating the worm blank on the worm axis and simultaneously moving the cutter arcuately along the blank at a speed proportional to the rate of rotation of the gear blank. Schurr provides a means for producing a worm with a true helix configuration. However, when forming worms having large diameter and with a land that makes few turns, there is no need to provide compensatory complex motion so that the worm tooth or groove has a constant profile or encircles the shank in a true helix. Schurr et al U.S. Pat. No. 1,243,767 shows an apparatus employing a plurality of cutting elements revolving into cutting engagement with a rotating gear blank. Trbojevich U.S. Pat. No. 2,011,956 suggests a method of cutting a globoid worm, but offers no apparatus for conveniently carrying out that method. Therein, the suggestion is to arcuately translate the worm blank relative to the cutter as it is rotated. Graves U.S. Pat. No. 2,126,990 shows a method for properly applying a cutting tool to the worm blank to finish the thread of a globoid worm.

SUMMARY OF THE INVENTION

The present invention provides a relatively simple and inexpensive improved means for cutting an arcuately-shaped worm. The apparatus herein is capable of producing a barrel-type worm that will mate with a large diameter internal ringgear.

In accordance with the invention, a frame is pivotally mounted for rotation about a fixed axis and journals a rotatable support shaft carrying a worm blank. The shaft is operatively connected to a gear which is journalled on the frame and meshes with a fixed gear segment so that upon rotation of the support shaft, the frame is forced to rotate about the fixed axis. The worm blank is thus caused to engage a cutting element as it is rotated on the worm axis and simultaneously arcuately translated. The apparatus herein permits the cutter to be disposed at any number of positions including an offset position to provide a low lead angle of the cutter on the surface of the worm blank.

In a preferred embodiment, the frame is pivotally mounted on a base for swinging movement about a horizontal axis. The base has a gear segment fixed thereto with a vertically oriented gear face. The shaft is operatively connected to a worm which meshes with the gear segment to traverse the segment and thus swing the frame about the fixed axis. As a result, the worm blank is moved past the cutter at a lead rate and helix angle to generate a worm tooth profile of desired configuration. By altering the gears to provide differing gear ratios, the rates may be changed to generate other worm configurations.

BRIEF DESCRIPTION OF THE DRAWINGS

FIG. 1 is a perspective view of the apparatus for cutting an arcuately-shaped worm; and FIG. 2 is a sectional view on an enlarged scale, taken substantially as indicated along the line II—II of FIG. 1

DESCRIPTION OF THE PREFERRED EMBODIMENT

A gear cutting apparatus constructed in accordance with the present invention includes a base, generally designated 10; a frame, generally designated 11, pivotally mounted on the base 10; a support shaft 12 journalled on the frame 11 and carrying a worm blank 13; a cutting element 14; power means, generally designated 15, for driving the apparatus; and frame pivoting means, generally designated 16.

The base 10 has a pair of upright brackets 17 and 18, each secured to a bottom plate 20 by screws 21. An arcuate spur gear segment, 22, is fixed to the bottom plate 20 intermediate the upright brackets 17 and 18. The gear segment 22 has a generally vertical gear face 24 which is on a radius of curvature centered on the pivot axis of the frame 11.

The frame 11 consists of a pair of Y-shaped side plates 25 and 26, a rectangular front block 28, a rectangular top block 30, a U-shaped block 31, and a rectangular back plate 32. The various plates and blocks are secured together in appropriate relation by a plurality of socket head shoulder screws 34. The frame 11 is pivoted on the base 10 on a horizontal shaft 35 which is carried by the upright brackets 17 and 18 and extends between the respective stems 37 and 38 of the plates 25 and 26 which flank the upright brackets 17 and 18. The frame 11 is thereby pivotally mounted for swinging movement about the fixed axis of the horizontal shaft 35. A retainer 40 is secured at each of the outer ends of the shaft 35 outside the plates 25 and 26 to maintain the shaft 35 in proper position.

The front block 28 is secured between the plates 25 and 26 and journals a vertically oriented shaft 41 so that it is rotatable in a plane generally perpendicular to that of the shaft 35. The shaft 41 carries a worm 42 at its lower end and a bevel gear 44 at its upper end. The worm 42 meshes with the gear segment 22.

The top block 30 is also secured between the plates 25 and 26 and journals the horizontally oriented support shaft 12 for axial rotation in a plane generally perpendicular to the fixed axis of the shaft 35. Preferably, it coincides with the plane containing the axis of the shaft 41. The shaft 12 carries the worm blank 13 at one end and has a bevel gear 45 at its other end which meshes with the bevel gear 44 to operatively couple the vertical shaft 41 to the support shaft 12 so that the shafts will rotate together in predetermined relation.

The U-shaped block 31 has legs 47 and 48 journalling a shaft 50 which carries a worm 51 that operatively engages and drives a spur gear 52 fixed to the horizontal shaft 12 intermediate the worm blank 13 and the bevel gear 45. Rotation may be imparted to the support shaft 12 by conventional power means such as a crank (not shown), which supplies rotational torque.

The worm blank 13 is secured axially to the support shaft 12 by a nut 54 and a shoulder washer 55 and is secured against rotation relative to the support shaft 12 by a key 57 attached to an internal shoulder 58 so that the worm axis corresponds with the axis of rotation of the support shaft 12. The worm blank 13 has a convexly arcuate outer surface 60, and in a vertical plane through the axis of the support shaft 12 and normal to the fixed pivot 35, the curve of said surface 60 remote from the fixed pivot is an arc of a circle struck about the axis of said pivot.

Hence, as the shaft 12 is rotated, the shaft 41 and the worm 42 is also rotated, causing the worm 42 to traverse the gear face 24 of the fixed gear segment 22. The relative movement between the gear segment 22 and the worm 42 swings the frame 11 about the shaft 35. The worm blank 13 is arcuately translated relative to the cutting element 14 as the worm blank 13 rotates about the worm axis. As a result, the worm axis is arcuately translated about the fixed axis in a plane perpendicular to the fixed axis. As the worm blank 13 rotates on the worm axis and simultaneously arcuately moves, the cutting element 14 forms a groove in the outer surface of the worm blank. The cutting element 14 is disposed adjacent the worm blank 13 so that it cuts a groove of predetermined size and shape in the surface of said worm blank. The generated worm thus has a groove 61 lying on a circular arc defined by a radius extending from the fixed axis of the shaft 35 and on a longitudinal series of circles defined by radii extending from the axis of the shaft 12.

The cutting element 14, as shown, is a conventional rotating grinding wheel of appropriate bevel, size and positional orientation to achieve the desired worm tooth configuration. However, any suitable grinding means may be substituted for the grinding wheel. Note that the gear segment 22, the shaft 35 and the cutting element 14 are positionally fixed relative to one another.

It can be appreciated that the cutting element 14 does not have to move as the worm blank 13 moves relative to it.

When the cutting element 14 is positioned so that the worm blank 13 is disposed intermediate the fixed axis of the shaft 35 and the cutting element 14 as shown in FIG. 2, a barreltype worm 62 (FIG. 1) is generated. When the cutting element 14 is disposed intermediate the fixed axis and the worm blank 13, a concave worm may be generated.

By appropriate selection of the gears employed in the apparatus, the worm blank 13 can be moved past the cutting element 14 at any predetermined worm lead rate and helix angle to produce a completed arcuately-shaped worm gear of any desired configuration.

What is claimed is:

1. An apparatus for cutting a worm blank to generate an arcuate worm, said apparatus comprising in combination:

a frame pivotally mounted for swinging movement about a fixed axis;

a support shaft journalled in said frame for axial rotation about an axis which is in a plane generally perpendicular to said fixed axis, said support being adapted to carry a worm blank with the worm axis on the support shaft axis;

a fixed gear segment the radius of curvature of which is centered on said fixed axis;

power means for rotating said support shaft including
a power transmission shaft journalled in said frame and adapted to be connected to a source of power to receive rotational torque therefrom,
an input worm fixed to said power transmission shaft, and
a spur gear fixed to the support shaft and meshing with said input worm, whereby rotation of the power transmission shaft rotates the support shaft;

cutting means disposed adjacent to a worm blank on the support shaft for cutting a groove in the surface of said worm blank;

a gear journalled in the frame and engaged with said fixed gear segment; and means for driving said gear in timed relationship with said shaft so that it traverses said fixed gear segment to swing the frame about said fixed axis whereby said worm blank is arcuately translated relative to said cutting means as said worm blank is rotated on the worm axis so that an arcuate worm is generated from said worm blank.

* * * * *

UNITED STATES PATENT AND TRADEMARK OFFICE
CERTIFICATE OF CORRECTION

PATENT NO. : 4,037,365
DATED : July 26, 1977
INVENTOR(S) : Carroll Richard Cole

It is certified that error appears in the above-identified patent and that said Letters Patent are hereby corrected as shown below:

Col. 2, line 66, "journale" should be --journals--;

Col. 4, line 24, after "support" insert --shaft--.

Signed and Sealed this

Twenty-ninth Day of November 1977

[SEAL]

*Attest:*

RUTH C. MASON
*Attesting Officer*

LUTRELLE F. PARKER
*Acting Commissioner of Patents and Trademarks*